United States Patent
Erdle et al.

(10) Patent No.: US 9,209,531 B2
(45) Date of Patent: Dec. 8, 2015

(54) BUS BAR RELEASABLE BUSHING APPARATUS

(71) Applicant: Eldre Corporation, Rochester, NY (US)

(72) Inventors: Harvey B. Erdle, Rochester, NY (US); Thomas A. Petote, Spencerport, NY (US); Joseph Thomas Arieno, Rochester, NY (US); Jesse A. Erdle, Pittsford, NY (US)

(73) Assignee: Eldre Corporation, Rochester, NY (US)

( * ) Notice: Subject to any disclaimer, the term of this patent is extended or adjusted under 35 U.S.C. 154(b) by 119 days.

(21) Appl. No.: 13/708,270

(22) Filed: Dec. 7, 2012

(65) Prior Publication Data

US 2013/0161069 A1    Jun. 27, 2013

Related U.S. Application Data

(60) Provisional application No. 61/567,763, filed on Dec. 7, 2011.

(51) Int. Cl.
*H01R 4/60* (2006.01)
*H01R 31/06* (2006.01)

(52) U.S. Cl.
CPC . *H01R 4/60* (2013.01); *H01R 31/06* (2013.01)

(58) Field of Classification Search
USPC .......................................... 248/188; 174/68.2
See application file for complete search history.

(56) References Cited

U.S. PATENT DOCUMENTS

| | | | |
|---|---|---|---|
| 1,775,281 A | * | 9/1930 | Hartle ............................ 432/155 |
| 2,363,663 A | * | 11/1944 | Findley ......................... 411/423 |
| 2,775,281 A | * | 12/1956 | Smith ............................ 411/301 |
| 3,880,041 A | * | 4/1975 | Markowski et al. ............. 411/34 |
| 3,886,654 A | | 6/1975 | Erdle |
| 5,064,059 A | * | 11/1991 | Ziegler et al. .................. 206/221 |
| 5,226,682 A | * | 7/1993 | Marrison et al. ............... 285/308 |
| 7,241,152 B2 | | 7/2007 | Charrier et al. ................. 439/97 |
| 7,425,144 B2 | * | 9/2008 | Bader et al. .................... 439/210 |

(Continued)

FOREIGN PATENT DOCUMENTS

| | | | |
|---|---|---|---|
| EP | 0945919 A1 | 9/1999 | ............... H01R 4/50 |
| FR | 2852450 A1 | 9/2004 | ............. H01R 13/73 |

(Continued)

OTHER PUBLICATIONS

ISA/US, International Search Report from corresponding PCT application No. PCT/US2012/068465 as compmleted on Jan. 28, 2013 (2 pages).

(Continued)

*Primary Examiner* — William H Mayo, III
*Assistant Examiner* — Krystal Robinson
(74) *Attorney, Agent, or Firm* — Kusner & Jaffe

(57) ABSTRACT

A bus bar component connection apparatus including an electrically conductive bus bar having a thickness and at least one bore, the bore having a diameter, a male bushing portion including a body having two opposing planar surfaces, at least one shoulder extending from the body at a first end and including a threaded portion disposed toward a second end and spaced from the first end by an undercut portion, and an axial bore through the body and the shoulder, a female bushing portion having two opposing planar surfaces, a first end, a second end, and an inner surface including a threaded portion disposed toward the second end and spaced from the first end by a first smooth portion, and wherein the female bushing portion is configured to threadably receive the shoulder through the hole of the bus bar.

17 Claims, 8 Drawing Sheets

(56) References Cited

U.S. PATENT DOCUMENTS

| | | |
|---|---|---|
| 7,775,819 B2 | 8/2010 | Bader et al. |
| 8,526,195 B2 | 9/2013 | Hublier et al. ............... 361/807 |
| 2007/0093144 A1 | 4/2007 | Charrier et al. ............... 439/801 |
| 2010/0243322 A1* | 9/2010 | Hublier et al. ............... 174/84 C |

FOREIGN PATENT DOCUMENTS

| | | | | |
|---|---|---|---|---|
| FR | 2922370 A1 | 4/2009 | ............... | H01R 4/18 |
| JP | S57201770 U | 12/1982 | ............... | F16B 19/08 |
| JP | 2004-39256 A | 2/2004 | ............... | H01L 23/48 |
| JP | 2011501354 A | 1/2011 | ............... | H01R 4/20 |

OTHER PUBLICATIONS

Office Action, dated Mar. 18, 2014, issued in connection with corresponding Japanese Patentn Application No. 2014-543640 (English-language translation included).

European Search Report from corresponding European Patent Application No. 12856432.5 dated Jul. 7, 2015.

* cited by examiner

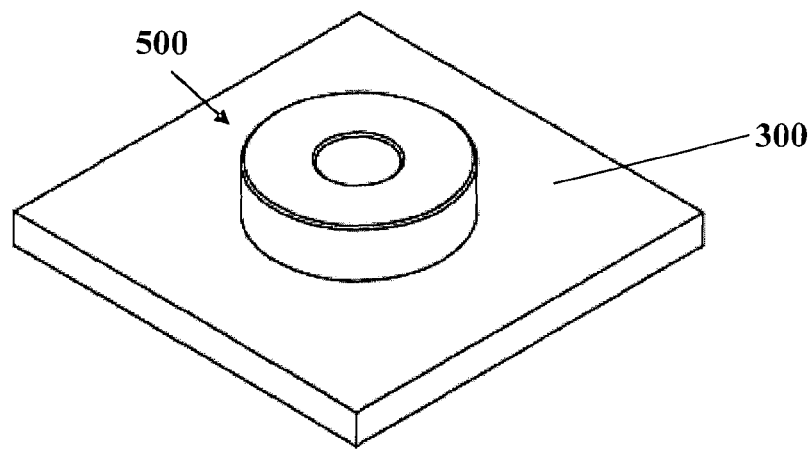
Fig. 6A
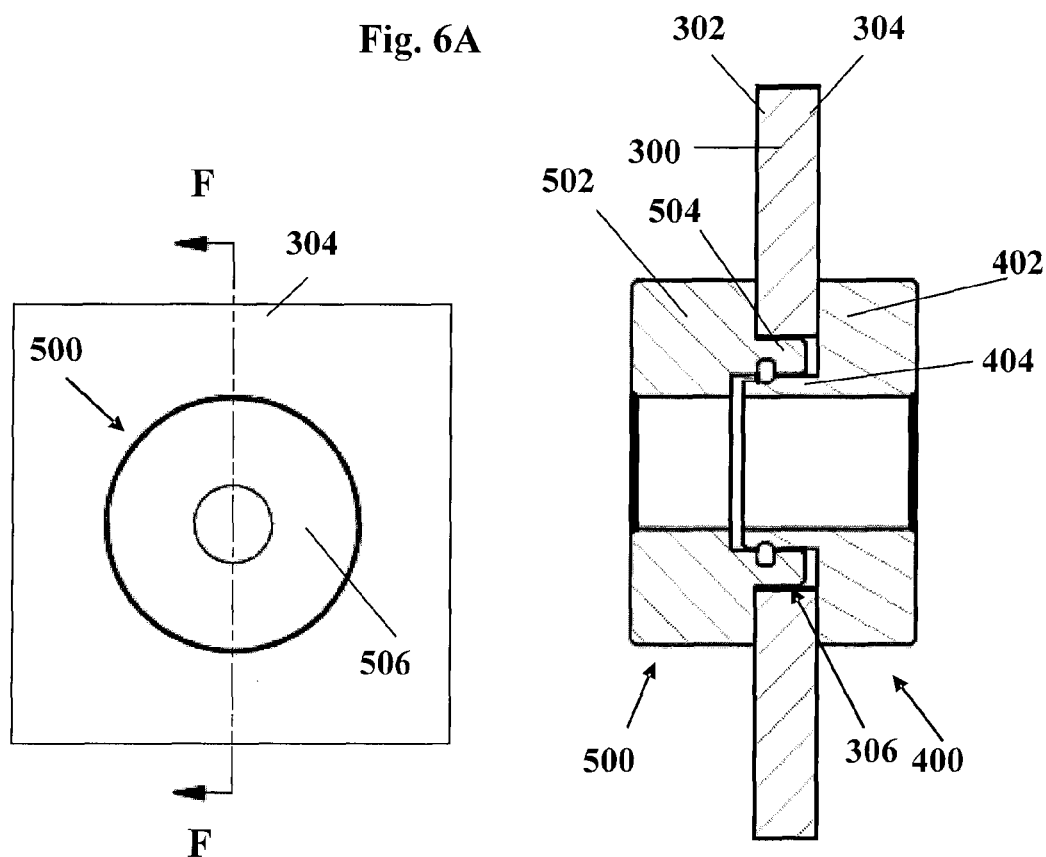
Fig. 6B
Fig. 6C

Fig. 9A
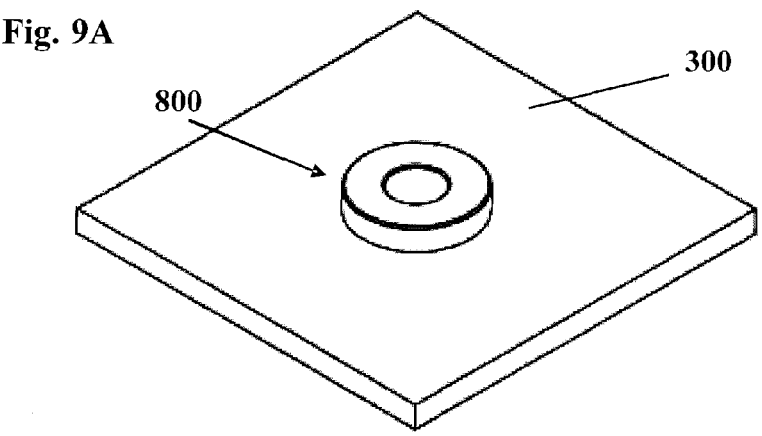
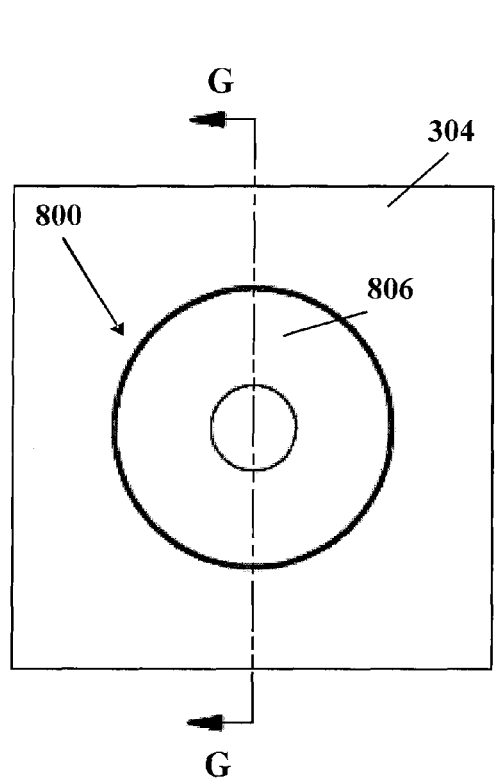
Fig. 9B
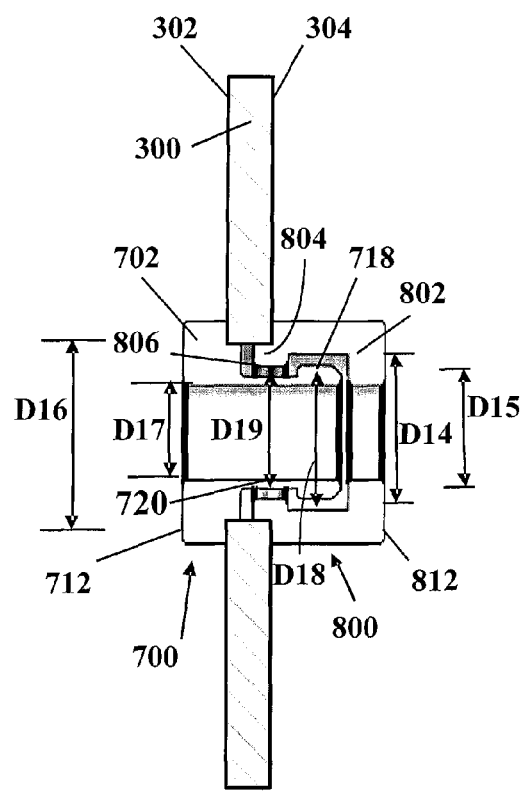
Fig. 9C

BUS BAR RELEASABLE BUSHING APPARATUS

CROSS-REFERENCE TO RELATED APPLICATIONS

This application claims priority to U.S. Provisional Patent Application Ser. No. 61/567,763 filed Dec. 7, 2011, the specification of which is hereby incorporated by reference in its entirety.

TECHNICAL FIELD

The present invention relates to power distribution systems and more particularly, to bus bar component connection apparatus.

BACKGROUND INFORMATION

Power distribution systems, or bus bars, are conductive plates including a plurality of holes for receiving electrical components such as insulated gate bi-polar transistor (IGBT) modules or circuit breakers, for example. The conductive plates may be made of any, and/or plated by, conductive material such as copper, aluminum, brass, or nickel, for example. The electrical components have various connection apparatus, including bushings, disposed proximate the bus bar holes. Generally, the bushings are soldered or welded to the bus bar and therefore suffer from common problems including compromised planarity, particularly in multilayer bus bars, reduced electrical connectivity and weak physical connection due to the introduction of the solder, corrosion, and thermal distortion. Such prior art bus bars also require substantial labor time and material expense to manufacture due to the soldering of each bushing, and associated flattening of the solder to provide a planar surface, and due to a preference for using relatively expensive copper bushings with copper bus bars due to the difficulty adhering different conductive materials, such as aluminum. Significantly, soldered bushing are not removable in the field and a failure may require replacement of the whole bus bar assembly.

Many of the above issues have been mitigated in the art such as by U.S. Pat. Nos. 7,7758,19 and 7,425,144 entitled "Buss Plate Bushing Retainer and Assembly Thereof" which disclose a cylindrical retainer for holding two bushing portions in place proximate a hole of a bus bar. While such connection apparatus do not require soldering and still provide reliable electrical connectivity, they are only removable using a tool to engage a detent in the retainer thereby requiring additional time for replacement in the field as well as increased likelihood of deformation of the retainer or other portion of the connection apparatus.

Accordingly, there is a need for a bus bar connection apparatus that does not require soldering, provides reliable electrical connectivity even with disparate conductive materials, and is easily released and replaced in the field.

BRIEF DESCRIPTION OF THE DRAWINGS

The present invention is disclosed with reference to the accompanying drawings, wherein:

FIG. 6A is a perspective view of a bus bar including a bushing according to one exemplary embodiment of the present invention;

FIG. 6B is a top view of the bus bar including bushing of FIG. 6A;

FIG. 6C is a cross-sectional view about line F-F of the bus bar including bushing of FIG. 6B;

FIG. 9A is a perspective view of a bus bar including a bushing according to one exemplary embodiment of the present invention;

FIG. 9B is a top view of the bus bar including bushing of FIG. 9A; and

FIG. 9C is a cross-sectional view about line F-F of the bus bar including bushing of FIG. 9B.

Corresponding reference characters indicate corresponding parts throughout the several views. The examples set out herein illustrate several embodiments of the invention but should not be construed as limiting the scope of the invention in any manner.

DETAILED DESCRIPTION

Figure 1A:
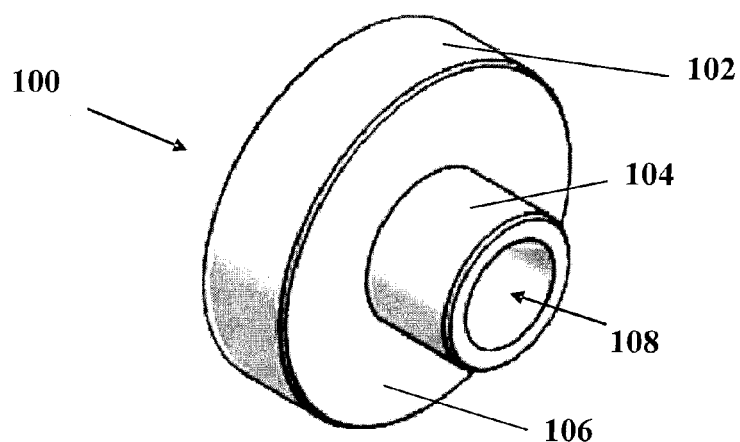
FIG. 1A is a perspective view of a male bushing portion according to one exemplary embodiment of the present invention.
Figure 1B:
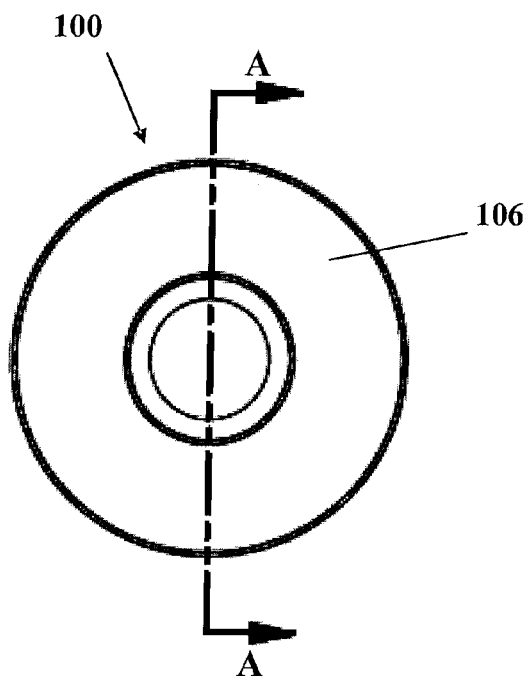
FIG. 1B a top view of the male bushing portion of FIG. 1A.
Figure 1C:
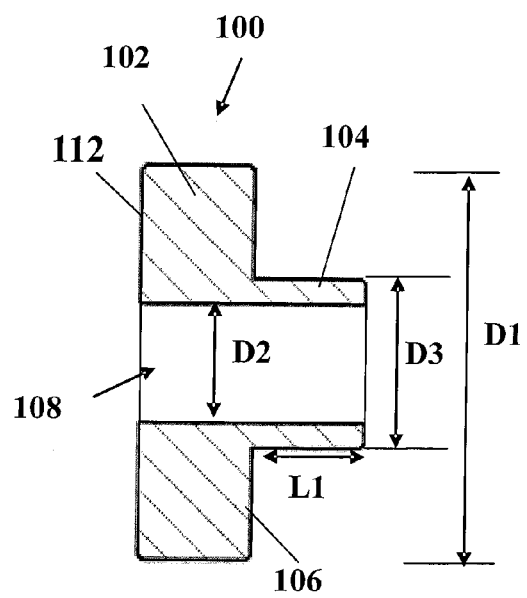
FIG. 1C is a cross-sectional view about line A-A of the male bushing portion of FIG. 1B.

Referring to FIG. 1A-1C, a male bushing portion 100 according to some embodiments of the present invention is shown. The male bushing portion 100 can be any suitable electrically conductive material such as copper or aluminum, for example. The male bushing portion 100 includes a body 102 which can be cylindrical, hexagonal, or any other shape including at least a first planar surface 106. Preferably, the male bushing portion body 102 includes opposing first 106 and second 112 substantially planar surfaces and is a hollow cylinder or toroid in shape including an outer diameter D1 and an axial bore 108 defining an inner diameter D2.

Extending from the first planar surface 106 of the body 102 is a shoulder 104 having a length L1, an outer diameter D3 and an axial bore 108 defining an inner diameter D2. In the exemplary embodiment shown, the diameter D2 of the axial bore 108 is substantially the same through the body 102 and shoulder 104. However, in some embodiments, the diameter of the axial bore 108 through the body 102 is greater than the diameter of the axial bore 108 through the shoulder 104.

Figure 2A:
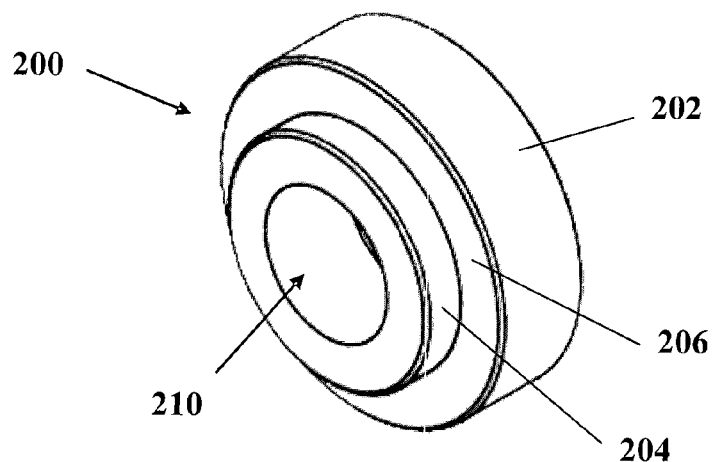
FIG. 2A is a perspective view of a female bushing portion according to one exemplary embodiment of the present invention.
Figure 2B:
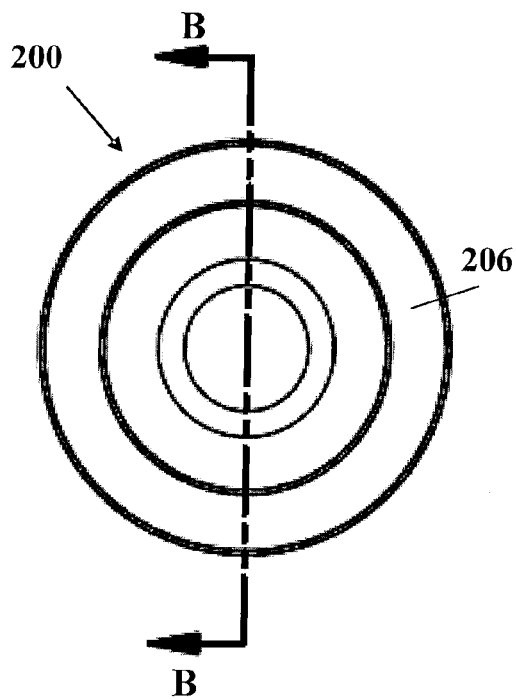
FIG. 2B a top view of the female bushing portion of FIG. 2A.
Figure 2C:
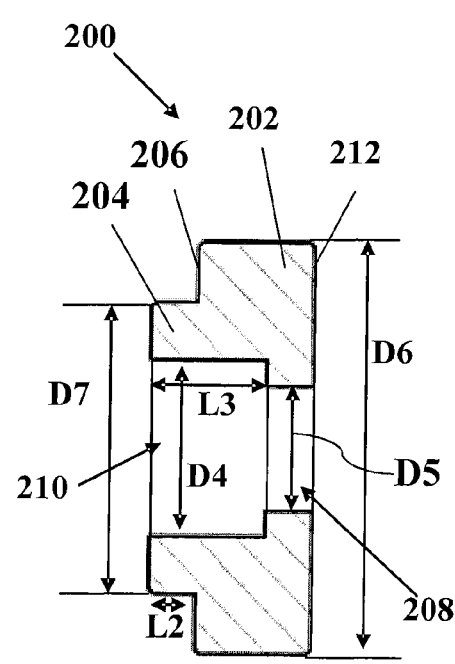
FIG. 2C is a cross-sectional view about line B-B of the female bushing portion of FIG. 2B.

Referring to FIG. 2A-2C, a female bushing portion 200 according to some embodiments of the present invention is shown. The female bushing portion 200 can be any suitable electrically conductive material such as copper or aluminum, for example. The female bushing portion 200 includes a body 202 which can be cylindrical, hexagonal, or any other shape including at least a first planar surface 206. Preferably, the female bushing portion body 202 includes opposing first 206 and second 212 substantially planar surfaces and is a hollow cylinder or toroid in shape including an outer diameter D6 and an axial bore 208 defining an inner diameter D5.

The example of the female bushing shown in FIGS. 2A-2C has a body 202 with a shoulder 204 with a diameter D7 that is smaller than the diameter D6 of the bushing body 202. Inside the body is a hole or bore 208 with a diameter D5 and a counterbore 210 with a larger diameter D4. The smaller bore D5 and the shoulder 204 are optional. The bushing may have both of them, one of them or neither, In the latter case, the bushing would resemble a washer with a uniform outside diameter and single bore. Similar modifications, including and not limited to shoulders and counterbores, may be made to the male bushing 100 of FIGS. 1A-1C without departing from the spirit and scope of the embodiments of the invention.

Preferably extending from the first planar surface 206 of the body 202 is a shoulder 204 having a length L2, an outer diameter D7, and an axial bore 210 defining an inner diameter D4 greater than the diameter D5 of the axial bore 210 through the body 202. The shoulder 204 is preferably provided to allow alignment of the female bushing portion 200 with the bore 306 of the bus bar 300 (see FIG. 3).

In the exemplary embodiment shown, the axial bore 210 of the shoulder 204 extends into the body 202. In some embodiments, the length L3 of the axial bore 210 is substantially the same as the length L2 of the shoulder 204. In those embodiments not including a shoulder 204, the body 202 includes a smaller first inner diameter D5 and larger second inner diameter D4 wherein the larger diameter portion is disposed toward the first surface 206. As in the exemplary embodiment of FIGS. 2A-2C, the female bushing portion 200 optionally has both a shoulder 204 and a body 202 having first D5 and second D4 inner diameters due to the differing lengths L2 and L3 of the shoulder 204 and the portion of the axial bore 210 having the larger diameter D4, respectively.

Figure 3A:
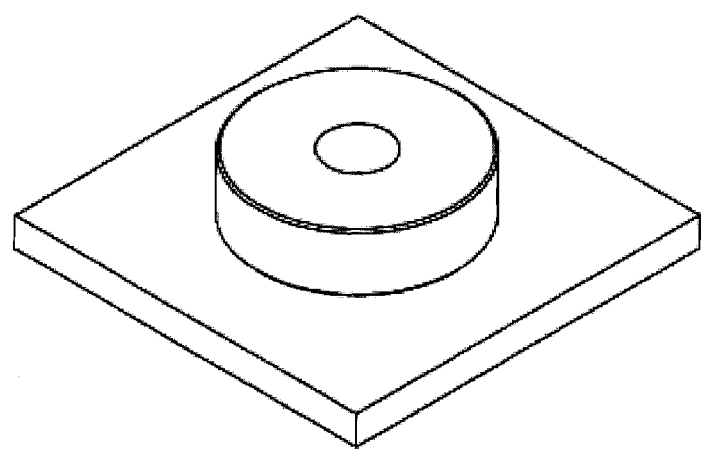
FIG. 3A is a perspective view of a bus bar including a bushing according to one exemplary embodiment of the present invention.
Figure 3B:
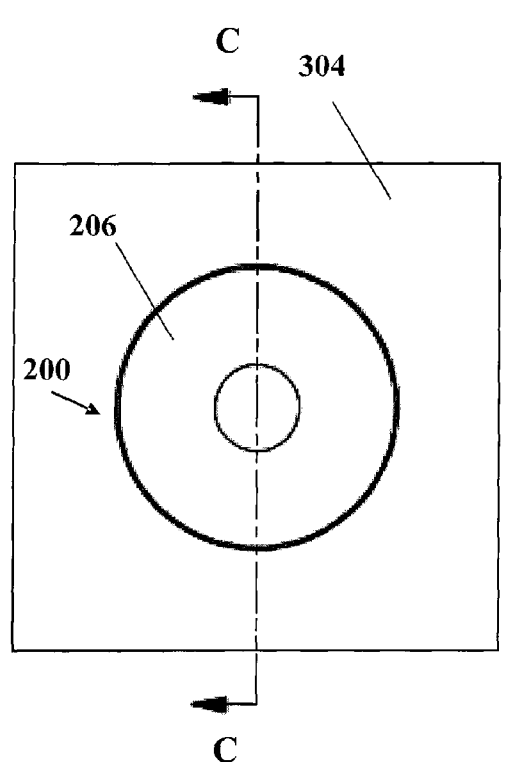
FIG. 3B is a top view of the bus bar including bushing of FIG. 3A.
Figure 3C:
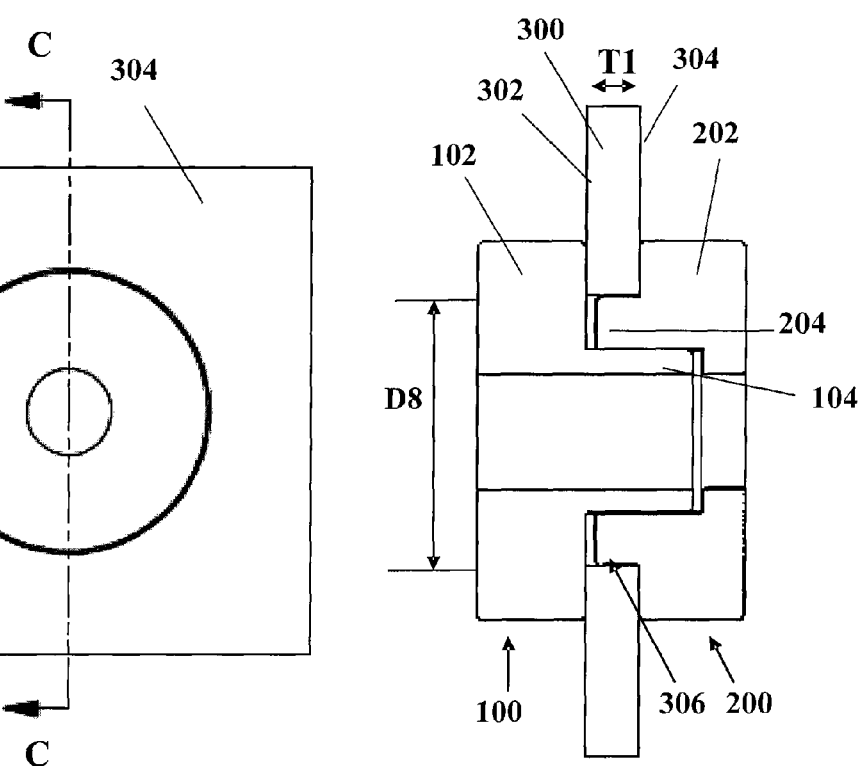
FIG. 3C is a cross-sectional view about line C-C of the bus bar including bushing of FIG. 3B.

Referring to FIGS. 3A-3C, a bus bar 300 including a bushing according to some embodiments of the present invention is shown. The bus bar 300 can be any electrically conductive material, such as copper, and preferably includes opposing planar surfaces 302, 304 spaced apart by a thickness T1. The bus bar 300 includes at least one bore 306 having a diameter D8, and generally includes a plurality of holes, for connecting various electrical components to the bus bar conductor 300. In the exemplary embodiment shown, the outer diameter D3 of the shoulder 104 is greater than the inner diameter D4 of the female bushing portion 200 such that the shoulder portions 104, 204 provide an interference fit when the male bushing portion 100 is received by the female bushing portion 200 and aligned proximate the bore 306 of the bus bar 300. It is preferable that the outer diameter D1 of the male bushing portion body 102 and the outer diameter D6 of the female bushing portion body 202 are greater than the diameter D8 of the bus bar bore 306 such that the bushing remains substantially in place when in use.

In operation, the outside diameter D3 of the male shoulder 104 is equal to or greater than the inside diameter D4 of the female bushing 200. The surface is finished slightly larger than the inner diameter D4 to provide an interference fit between the bushing members. In alternate embodiments, the male shoulder 104 may be tapered and the bore defined by diameter D4 of the female bushing will have a equal or slightly reduced complimentary taper.

Further variations in the interference bushing embodiment of the invention include alternate shapes for the mating male shoulder and female bore, including and not limited to obround shapes defined by opposite curved ends and parallel walls between the curved ends. Still other shapes are possible including triangular, rectangular and other regular polygonal shapes or even irregular shapes so long as the male shoulder and the female bore have the same relative complimentary shape and the external surface topology of the male should is equal to or greater than the internal surface topology of the female bore.

In some embodiments, the length L3 of the portion of the axial bore 210 having a diameter D4 is substantially equal to the length L1 of the male bushing portion shoulder 104. In these embodiments, upon receiving the male bushing portion 100, the first surface 206 of the female bushing portion 200 advantageously establishes increased contact with the bus bar 300 as does the first surface 106 of the male bushing portion 100.

In some embodiments including a shoulder 204, the outer diameter D7 of the shoulder 204 is configured to be slightly smaller than the diameter D8 of the bus bar bore 306 to provide increased surface area contact of the shoulder 204 and the bus bar 300 and associated electrical connectivity.

In some preferred embodiments, the combined length L1, L2 of the male and female bushing portion shoulders 104, 204 is greater than the thickness T1 of the bus bar 300 so as to provide increased interference engagement of male and female bushing portions 100, 200.

In some preferred embodiments, the inner diameter D1 of the body 102 and shoulder 104 and the inner diameter D5 of the body 202 are substantially the same so as to receive a component having the same corresponding size connector and with increased surface area engagement and associated electrical connectivity.

The interference fit bushings of the present invention are an improvement over the prior art and eliminate the need to solder bushings to a bus bar thereby significantly reducing manufacture time and expense as well as improving electrical connectivity, bus bar surface planarity, installation and field replacement time, and allowing for replacement of individual bushings without replacing the bus bar assembly. While the interference fit bushing embodiments can be separated by force and either reinserted or replaced, the exemplary embodiments of the present invention shown in FIGS. 4A-9C provide for more secure engagement of the male and female bushing portions while still allowing for simple release, installation, and field replacement.

Figure 4A:
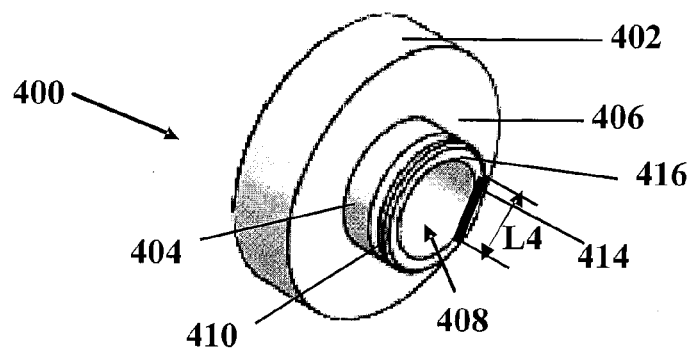
FIG. 4A is a perspective view of a male bushing portion according to one exemplary embodiment of the present invention.
Figure 4B:
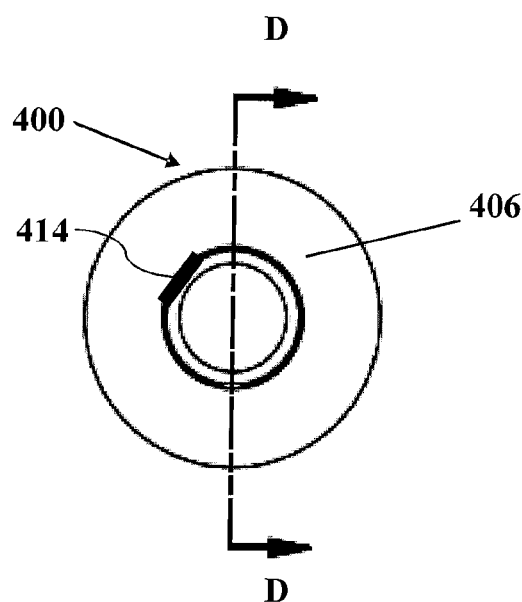
FIG. 4B is a top view of the male bushing portion of FIG. 4A.
Figure 4C:
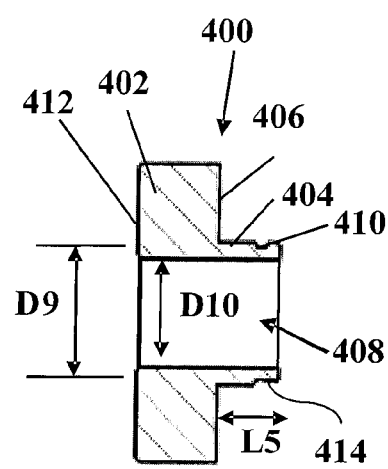
FIG. 4C is a cross-sectional view about line D-D of the male bushing portion of FIG. 4B.

Referring to FIGS. 4A-4C, some embodiments of a male bushing portion 400 according to the present invention include a body 402 including opposing planar surfaces 406, 412, a shoulder or boss 404 having a proximate end at the body and a distal end spaced from the body. The shoulder has an outer surface with a key retaining groove 410 on the outer surface. The retaining groove is located just inside the distal end of the shoulder 404. An axial bore 408 extends through the body 402 and shoulder 404. The key retaining groove 410 is an annular groove spaced from the body 402 and extending the circumference of the shoulder 404 and having a diameter less than the outer diameter D9, and greater than the inner diameter D10, of the shoulder 404. The shoulder 404 further includes a flat 414 that is machined in the end 416 of the shoulder 404 and extends from the end of the shoulder into the retaining groove 410 and has a length L4.

Figure 5A:
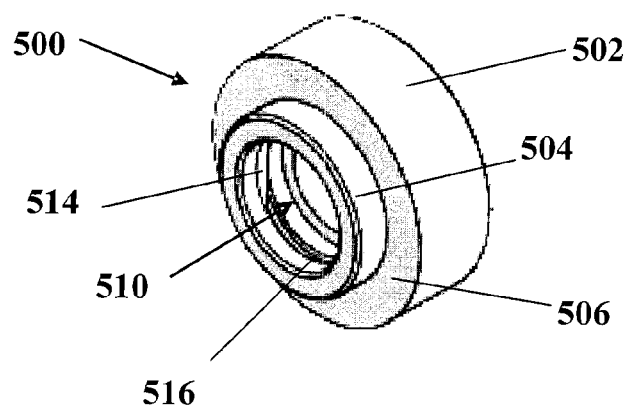
FIG. 5A is a perspective view of a female bushing portion according to one exemplary embodiment of the present invention.
Figure 5B:
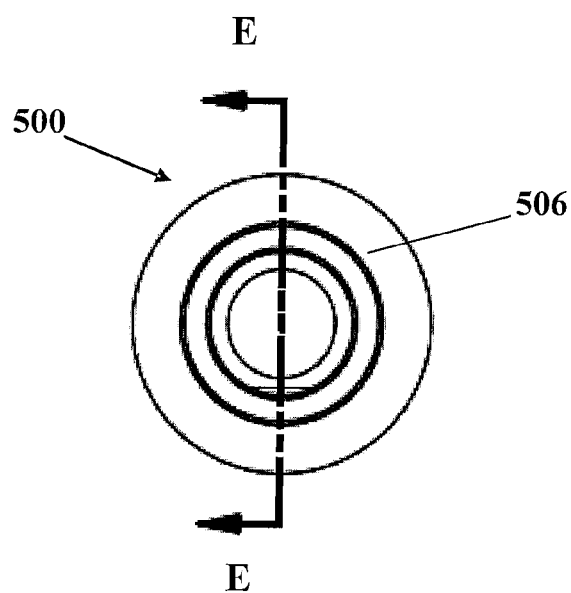
FIG. 5B is a top view of the female bushing portion of FIG. 5A.
Figure 5C:
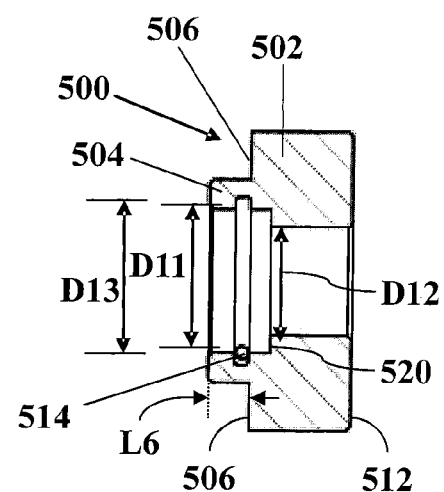
FIG. 5C is a cross-sectional view about line E-E of the female bushing portion of FIG. 5B.
Figure 7:
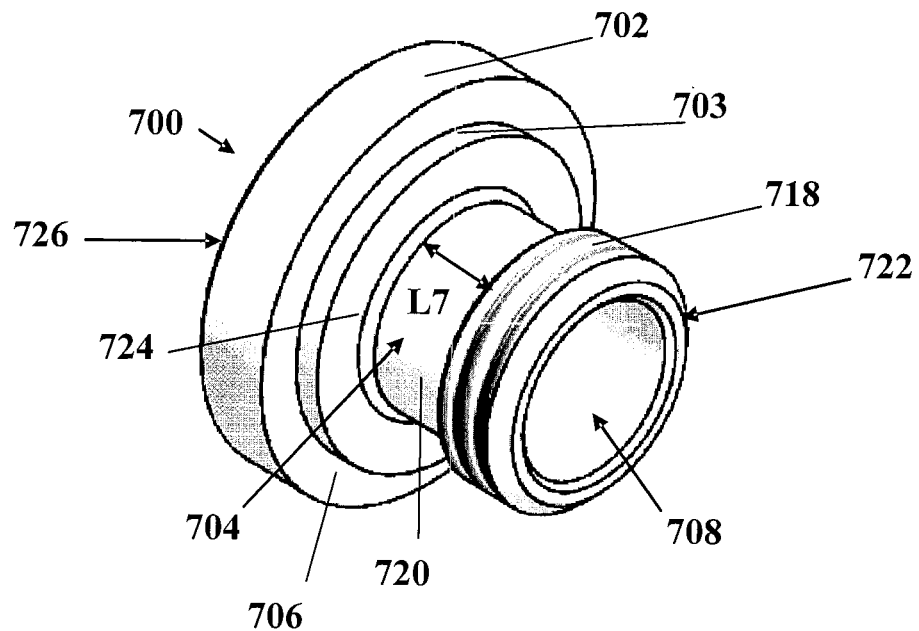
FIG. 7 is a perspective view of a male bushing portion according to one exemplary embodiment of the present invention.
Figure 8:
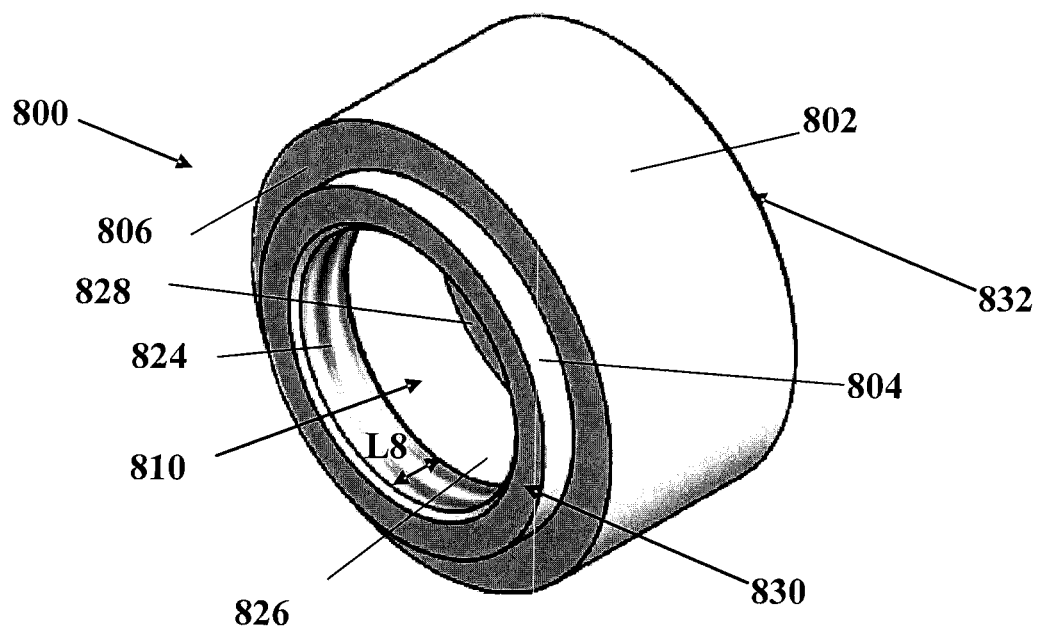
FIG. 8 is a perspective view of a female bushing portion according to one exemplary embodiment of the present invention.

Referring to FIGS. 5A-5C, some embodiments of a female bushing portion 500 according to the present invention include a body 502 including opposing first and second planar surfaces 506, 512, a shoulder or boss 504 including a key 514, and coounterbore D11 in the shoulder 504 and terminating of the surface 520 of bore D12 which could be any depth in the part or entirely through the part. In other words, no counterbore is required. In one of the embodiments the key 514 is a straight section of wire. The key 514 extends from the interior surface of the body 502 and/or shoulder 504 proximate the axial bore 510. A placement hole is drilled in the shoulder 504 or the body 502 transverse to the axis of the shoulder. The key wire 514 is fit into the placement hole. The key wire is disposed in the bore 510 similar to a chord crossing a circle.

The key 514 extends from an optional annular portion 516 disposed on the interior surface of one of the body 502 and/or shoulder 504 and having a diameter D13 greater than at least one of the diameters D11, D12 of the axial bore 510. In the embodiment shown, the annular portion 516 is disposed proximate the axial bore 510 at the shoulder 504 and, accordingly, has a diameter D13 greater than the larger diameter D11 of the axial bore 510. The annulus allows some spring action movement of the key 514, but that spring action is optional. The key 514 preferably has a length substantially equivalent to or smaller than the length of the flat 414 of the shoulder 404.

In operation, as shown in FIGS. 6A-6C, the female bushing portion 500 is configured to receive the male bushing portion 400 when aligned proximate a bore 306 in the bus bar 300. In order to retain the male bushing portion 400, the female bushing portion 500 receives the shoulder 404 by alignment of the flat 414 with the key 514. Once the shoulder 414 is inserted into the female portion 500 so as to align the key 514 with the key retaining groove 410, either bushing portion 400, 500 is rotated less than a full revolution in either direction and the key retaining groove 410 thereby impedes axial movement of the bushing portions 400, 500. The flat 414 is aligned with the key 514, is pressed past the key and the two portions of the bushing are rotated relative to each other so that the flat 414 passes over the key 514 to enable the key 514 to engage the retaining groove 410 which holds together the bushing portions 400, 500. Should the bushing portions need to be disconnected, such as in the field, rotating either bushing portion 400, 500 so as to align the key 514 and the flat 414 will allow axial movement of the bushing portions 400, 500 if enough force is applied to move the flat 414 over the key 514.

While FIGS. 5A-6C show a female bushing portion 500 including a shoulder 504, in some embodiments a shoulder 504 to align the bushing portion 500 with the bore 306 of the bus bar 300 is not provided and the key 514 is disposed proximate the axial bore 510 at the body 502. In these embodiments, the outer diameter D9 of the shoulder 404 is smaller than the diameter D12 of the axial bore 510 through the body portion.

In some preferred embodiments, the combined length L5, L6 of the male and female bushing portion shoulders 404, 504 is greater than the thickness T1 of the bus bar 300 such that engagement of the bushing portions 400, 500 causes the first surfaces 406 and 506 to establish increased contact with the first 304 and second 302 surfaces of the bus bar 300, respectively, thereby providing increased electrical connectivity.

Accordingly, the embodiments of the present invention including a key 514 and key retaining groove 410 provide increased security of engagement of the bushing portions as compared to the interference fit embodiments of FIGS. 1-3. However, some applications require still more integrity of engagement of the bushing portions. Accordingly, some embodiments of the present invention provide for threadable engagement of the bushing portions as described below with reference to FIGS. 7-9.

A male bushing portion 700 according to some embodiments is shown in FIGS. 7 and 9A-9C as including a first end 726 and a second end 722, a body 702 disposed toward the first end 726 and including opposing planar surfaces 706, 712. Extending from the body 702 is an optional first shoulder 703 for locating the male bushing portion 700 proximate a opening 306 in a bus bar (see FIG. 9), the first shoulder 703 has an outer diameter less than the outer diameter of the body 702 and less than the diameter D16 of the opening 306 of the bus bar, and an inner diameter D17, a second shoulder or boss 704 extending from the first shoulder 703 toward the second end 722, and an axial bore 708 through the body 702, first shoulder 703, and second shoulder 704, the axial bore 708 having a least one diameter and preferably exactly one diameter D17. The second shoulder 704 includes an outer surface including a plurality of threads 718 extending from at least a portion thereof. The plurality of threads 718 are disposed toward the second end 722 and spaced from the first shoulder 703 and the body 702 by an undercut portion 720 of the outer surface. Accordingly, the second shoulder 704 includes a threaded diameter D18 and an undercut diameter D19 wherein the threaded diameter D18 is greater than the undercut diameter D19.

A female bushing portion 800 according to some embodiments of the present invention is shown in FIGS. 8 and 9A-9C as including a first end 832 and a second end 830, a body 802 disposed at the first end 832 and including opposing first and second substantially planar surfaces 806, 812, an optional shoulder or boss 804, for locating the male bushing portion 700 proximate a hole 306 in a bus bar (see FIG. 9), extending from the body 802, and an axial bore 810 through the body 802 and the shoulder 804. Disposed on an inner surface of at least the shoulder 804, and toward the second end 830, is a threaded portion 824 defining a threaded diameter D15 and spaced from the second end 832 by a first smooth portion 826 defining a first smooth diameter D14 larger than the threaded diameter D15 and a second smooth portion 828 defining a second smooth diameter smaller than both the threaded diameter D15 and the first smooth diameter D14 and preferably substantially equivalent to a least one of the diameters D17 of the axial bore 708.

In operation, the threaded portion 824 of the female bushing portion 800 is configured to receive the threaded portion 718 of the male bushing portion 700 when the bushing portions 700, 800 are aligned proximate a hole 306 of a bus bar 300. The threaded portion 718 is preferably configured to thread through the threaded portion 824 to be disposed proximate the first smooth portion 826, having a diameter D14 larger than the diameter D18 of the threaded portion 718. Rotating the portions 700, 800 relative to each other advances the male bushing portion until it runs past the threaded portion of the female bushing portion. In other words, before the threads cause the bushing bodies to clamp onto the bus bar, the threads run out and the bushing bodies are held in place on the bar but are free to turn with respect to each other. The threads then function as interference members to prevent the bushing bodies from coming apart. Of course, the parts can be separated from each other if the user re-engages the threads to unscrew the bushing bodies from each other. To do this the user exerts a small force on each busing in a direction away from the other bushing to thereby engage the threads and enable the reverse operation to unscrew the bushing bodies from each other. Accordingly, the axial movement of the bushing portions 700, 800 relative to each other is impeded unless the male bushing portion 700 is rethreaded onto the female bushing portion 800 in the counter direction. As explained below, the undercut portion 720 is sized so that the bus bar 300 is disposed between the two portions 700, 800 when the male portion runs off the female thread.

In some preferred embodiments, the length L7 of the undercut portion 720 is substantially equivalent to the combined length L8 of the threaded portion 824 and the thickness T1 of the bus bar 300 such that engagement of the bushing portions 700, 800 causes the first surfaces 706 and 806 to establish increased contact with the first 302 and second 304 surfaces of the bus bar 300, respectively, thereby providing increased electrical connectivity.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A bus bar connection apparatus for attachment to an electrically conductive bus bar, the bus bar having a thickness and including a first planar surface, a second planar surface disposed in a plane substantially parallel to the first planar surface, and at least one hole, the bus bar connection apparatus comprising:
    a male bushing portion including:
        a body having at least a first surface configured to be disposed proximate the first planar surface of the bus bar, an axial bore, an inner diameter, and an outer diameter; and
        a shoulder extending from the first surface wherein the shoulder has a length, an axial bore, an inner diameter, and an outer diameter; and
    a female bushing portion including:
        a body having at least a first surface configured to be disposed proximate the second planar surface of the bus bar, an axial bore, an inner diameter, and an outer diameter; and
        a shoulder extending from the first surface wherein the shoulder has a length, an axial bore, an inner diameter, and an outer diameter; and
    wherein the outer diameter of the shoulder of the male bushing portion is greater than the inner diameter of the shoulder of the female bushing portion such that when the shoulder of the male bushing portion extends through the hole of the bus bar and into the shoulder of the female bushing portion an interference fit retains the male bushing portion and the female bushing portion together as an integrated unit such that the male bushing portion securely engages the female bushing portion.

2. The bus bar connection apparatus of claim 1 wherein the combined length of the shoulder of the male bushing portion and the shoulder of the female bushing portion is greater than the thickness of the bus bar.

3. The bus bar connection apparatus of claim 1 wherein the outer diameter of the body of the male bushing portion and the outer diameter of the body of the female bushing portion are greater than the diameter of the hole of the bus bar.

4. The bus bar connection apparatus of claim 1 wherein the male and female bushing portions are configured to be disposed proximate the hole of the bus bar such that the shoulder of the female bushing portion extends through the hole of the bus bar to receive at least a portion of the shoulder of the male bushing portion.

5. The bus bar connection apparatus of claim 1 wherein the inner diameter of the body of the male bushing portion and the inner diameter of the shoulder of the male bushing portion are substantially the same.

6. The bus bar connection apparatus of claim 5 wherein the inner diameter of the body of the female bushing portion is substantially the same as the inner diameter of the shoulder of the male bushing portion and the inner diameter of the body of the male bushing portion.

7. The bus bar connection apparatus of claim 1 wherein the inner diameter of the shoulder of the female bushing portion is greater than the inner diameter of the body of the female bushing portion.

8. The bus bar connection apparatus of claim 1 wherein:
    each of the shoulders further includes an inner surface and an outer surface;
    the outer surface of the shoulder of the male bushing portion includes a plurality of threads having a threaded diameter and an undercut having an undercut diameter wherein the threaded diameter is greater than the undercut diameter;
    the inner surface of at least one of the shoulder of the female bushing portion and the body of the female bushing portion further includes a plurality of threads; and
    wherein the plurality of threads of the female bushing portion are configured to engage the plurality of threads of the shoulder of the male bushing portion so as to retain the male and female bushing portions together as an integrated unit.

9. A bus bar connection apparatus for attachment to an electrically conductive bus bar, the bus bar having a first surface, an opposite-facing second surface and at least one hole extending therethrough, the bus bar connection apparatus comprising:
    a male bushing portion including a body having a first surface, an opposite-facing second surface and an elongated boss, the elongated boss extending from the first surface of the body and having a threaded portion formed on an outer surface of the elongated boss near a distal end thereof, and an undercut portion formed into the outer surface of the elongated boss at a location between the threaded portion and the first surface of the body, and an axial bore extending through the body and the boss; and
    a female bushing portion including a body having a first surface, an opposite-facing second surface, and a tubular-shaped boss, the tubular-shaped boss extending from the first surface and having a generally cylindrical inner surface wherein a threaded portion of the inner surface is disposed near a distal end of the boss and an undercut portion of the inner surface is disposed between the first surface of the female bushing portion and the threaded portion;
    wherein the elongated boss of the male bushing portion extends through the at least one hole of the bus bar and into the tubular-shaped boss of the female bushing portion such that the entire threaded portion of the male bushing portion is disposed adjacent to the undercut portion of the female bushing portion and the entire threaded portion of the female bushing portion is disposed adjacent to the undercut portion of the male bushing portion to retain the male bushing portion in the female bushing portion, and the threaded portion of the female bushing portion does not engage the threaded portion of the male bushing portion.

10. The bus bar connection apparatus of claim 9 wherein the undercut portion of the female bushing portion is dimensioned to retain the threaded portion of the male bushing portion when the threaded portion of the male bushing portion is threaded completely through the threaded portion of the female bushing portion.

11. The bus bar connection apparatus of claim 9 wherein the undercut portion of the male bushing portion has a length greater than or equal to the thickness of the bus bar and the length of the threaded portion of the female bushing portion.

12. The bus bar connection apparatus of claim 9 wherein the diameter of the threaded portion of the male bushing portion is smaller than the diameter of the hole of the bus bar.

13. The bus bar connection apparatus of claim 9 wherein the diameter of the undercut portion of the female bushing portion is larger than the diameter of the threaded portion of the male bushing portion.

14. The bus bar connection apparatus of claim 9 further including a hole extending through the body of the female bushing portion, the hole having a diameter smaller than the undercut portion of the boss of the female bushing portion and equal to the diameter of the axial bore extending through the male bushing portion.

15. The bus bar connection apparatus of claim 9 wherein at least one of the body of the male bushing portion and the body of the female bushing portion have an outer diameter greater than the diameter of the hole of the bus bar.

16. A bus bar connection apparatus for attachment to an electrically conductive bus bar, the bus bar having a first surface, an opposite-facing second surface and at least one hole extending therethrough, the bus bar connection apparatus comprising:

a male bushing portion including:
  a substantially cylindrical body having two opposing planar surfaces and an outer diameter;
  a substantially cylindrical boss extending from one planar surface of the body and having an outer diameter less than the outer diameter of the body; and
  an axial bore extending through the body and the boss and having at least one diameter;
  wherein an annular groove is formed in an outer surface of the boss and has a diameter that is smaller than the outer diameter of the boss;
a female bushing portion including:
  a substantially cylindrical body having two opposing planar surfaces and an outer diameter;
  a substantially cylindrical boss extending from the body and having an outer diameter less than the outer diameter of the body;
  an axial bore extending through the body and the boss and having at least one diameter; and
  a hole extending in the boss or the body in a direction generally perpendicular to a longitudinal axis of the boss wherein the hole intersects a wall of the axial bore near the outer diameter of the axial bore; and
a key disposed within the hole of the female bushing portion wherein the key is partially disposed within the axial bore of the female bushing portion such that the key defines a chord of the axial bore;
wherein the boss of the male bushing portion extends through the hole of the bus bar and into the axial bore of the female bushing portion such that the annular groove of the boss of the male bushing portion receives the key disposed in the female bushing portion to retain the male bushing portion in the female bushing portion.

17. The bus bar connection apparatus of claim 16 wherein the outer surface of the boss includes a flat for receiving the key as the male bushing portion is inserted into the female bushing portion.

* * * * *